(12) United States Patent
Mamyshev et al.

(10) Patent No.: US 8,660,440 B2
(45) Date of Patent: Feb. 25, 2014

(54) SELF-ADAPTIVE RECEIVERS NOT REQUIRING FEC FEEDBACK

(75) Inventors: Pavel Mamyshev, Morganville, NJ (US); Joel R. Edinberg, Somerville, MA (US)

(73) Assignee: Oclaro (North America), Inc., San Jose, CA (US)

( * ) Notice: Subject to any disclaimer, the term of this patent is extended or adjusted under 35 U.S.C. 154(b) by 249 days.

(21) Appl. No.: 13/112,984

(22) Filed: May 20, 2011

(65) Prior Publication Data

US 2012/0039618 A1   Feb. 16, 2012

Related U.S. Application Data

(60) Provisional application No. 61/346,690, filed on May 20, 2010.

(51) Int. Cl.
*H04B 10/61* (2013.01)

(52) U.S. Cl.
USPC .............................. 398/212; 398/203; 398/208

(58) Field of Classification Search
USPC .......................................... 398/203, 208, 212
See application file for complete search history.

(56) References Cited

U.S. PATENT DOCUMENTS

| | | | |
|---|---|---|---|
| 7,394,992 B2 | 7/2008 | Kimmitt et al. | |
| 7,546,041 B2 | 6/2009 | Griffin | |
| 7,949,261 B2 | 5/2011 | Mikkelsen et al. | |
| 2004/0042802 A1 | 3/2004 | Ho et al. | |
| 2005/0019042 A1* | 1/2005 | Kaneda et al. | 398/208 |
| 2007/0196110 A1* | 8/2007 | Mikkelsen et al. | 398/140 |
| 2009/0208226 A1* | 8/2009 | Gao et al. | 398/202 |
| 2010/0284702 A1* | 11/2010 | Malouin et al. | 398/208 |
| 2011/0091204 A1 | 4/2011 | Doran et al. | |

FOREIGN PATENT DOCUMENTS

| | | |
|---|---|---|
| JP | 2008-219765 A | 9/2008 |
| JP | 2009-232330 A | 10/2009 |
| JP | 2010-16655 A | 1/2010 |
| WO | WO 2008/017054 | 2/2008 |

OTHER PUBLICATIONS configure. (2007). In The American Heritage® Dictionary of the English Language; http://www.credoreference.com/entry/hmdictenglang/configure; retrieved May 7, 2013.*
PCT/US2011/037454 International Search Report (Sep. 22, 2011).

(Continued)

*Primary Examiner* — Nathan Curs
(74) *Attorney, Agent, or Firm* — Fenwick & West LLP

(57) ABSTRACT

Optical communications networks rely on optical receivers to demodulate optical signals and convert the demodulated optical signal into an electrical signal. Optical receivers may be associated with one or more characteristics which can be made to vary during a transmission of an optical signal in order to improve the quality of the received signal. The present invention may determine a value for the characteristics based on an amount of optical filtering on a communications link which transmits the signal. The value for the characteristics of the receiver may be determined by observing a characteristic of a detector associated with the receiver, such as a ratio of the average photocurrents of the constructive and destructive ports of the detector. The observed characteristic of the detector may be mapped to a predetermined value for the characteristic of the receiver in a lookup table, which may be queried during operation of the receiver.

24 Claims, 10 Drawing Sheets

(56) References Cited

OTHER PUBLICATIONS

Patent Cooperation Treaty, Written Opinion of the International Searching Authority, International Patent Application No. PCT/US2011/037454, Mailed Sep. 22, 2011, 8 Pages.

Winzer et al., "Degradation in Balanced DPSK Receivers," IEEE Photonics Technology Letters, vol. 15, No. 9, pp. 1282-1284, Sep. 2003.

Japanese Patent Office, Notice of Reasons for Rejection, Japanese Patent Application No. 2013-511402, Nov. 12, 2013, 5 Pages.

* cited by examiner

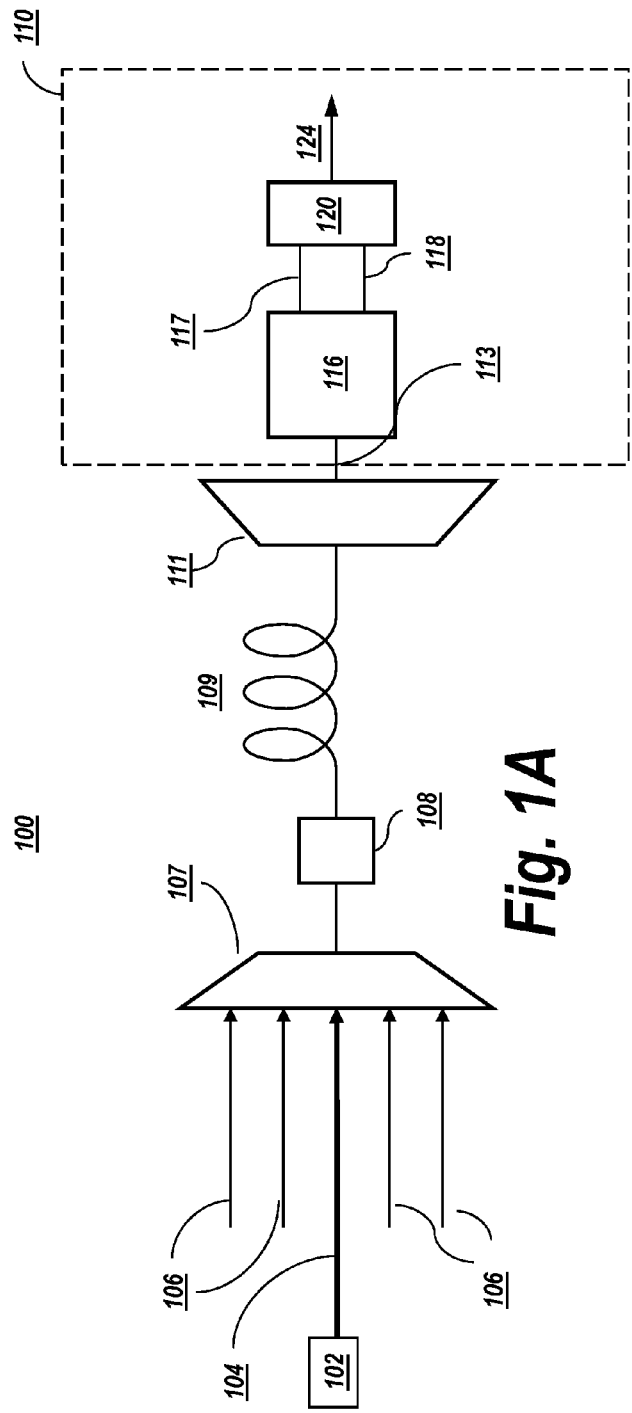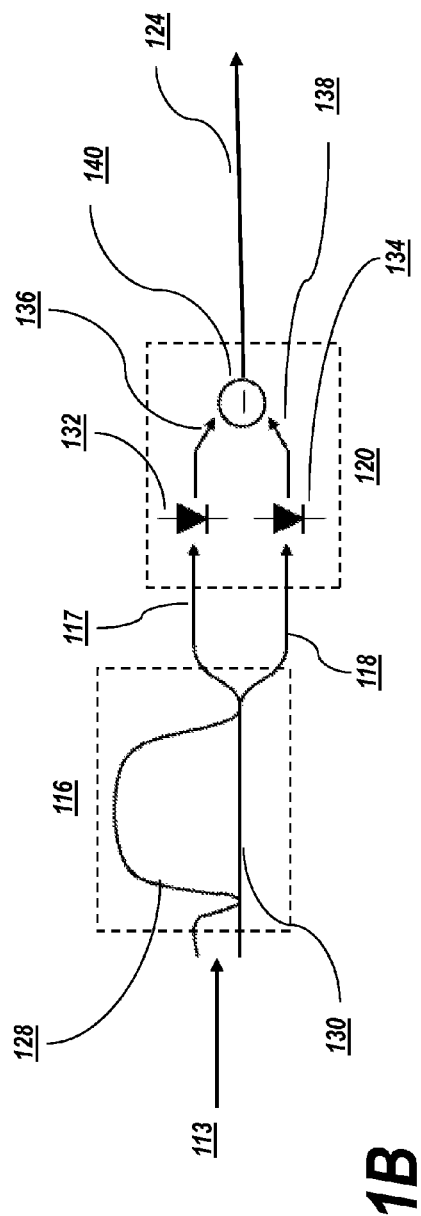
Fig. 1A
Fig. 1B

SELF-ADAPTIVE RECEIVERS NOT REQUIRING FEC FEEDBACK

RELATED APPLICATIONS

This application claims priority to U.S. Provisional Application Ser. No. 61/346,690, filed on May 20, 2010. The contents of the aforementioned application is incorporated herein by reference.

BACKGROUND OF THE INVENTION

This invention generally relates to optical communications, and in particular to a method and system for determining the amount of optical filtering present in an optical communications network and setting values for receiver characteristics according to the amount of optical filtering.

The backbone of point-to-point information transmission networks is a system of optically amplified dense wavelength division multiplex (DWDM) optical links. DWDM optical fiber transmission systems operating at channel rates of 40 Gb/s and higher are highly desirable because they potentially have greater fiber capacity and also have lower cost per transmitted bit compared to lower channel rate systems.

The modulation format of 40 Gb/s DWDM transmission systems is typically chosen to have high Optical Signal-to-Noise Ratio (OSNR) sensitivity. High OSNR sensitivity means that a low OSNR is sufficient to maintain a desired bit error ratio (BER) of the transmission or, equivalently, that the system is able to operate at a desired BER even in the presence of a high level of optical noise. In addition, modulation formats of 40 Gb/s DWDM transmission systems are typically chosen to be tolerant to optical filtering because existing systems sometimes include optical multiplexers and demultiplexers for 50 GHz channels spacing that limit the bandwidth. Also, existing systems sometimes include cascaded optical add-drop multiplexers.

Accordingly, Differential Phased Shift Keying (DPSK) has been considered for 40 Gb/s DWDM transmission systems, in part because DPSK transmission systems have excellent OSNR sensitivity. DPSK transmission systems using balanced direct detection receivers, which are sometimes referred to as differential receivers, have been shown to have an approximately 3 dB improvement of OSNR sensitivity compared to on-off keying systems, such as NRZ and PSBT systems. However, conventional DPSK transmission systems do not have good filter tolerance.

In a DPSK system, data is encoded onto a carrier wave by shifting the phase of the carrier wave. The amount of the phase shift may be selected based on the amount of data to be encoded with each phase shift. For example, DPSK is sometimes referred to as Differential Binary Phase Shift Keying (DBPSK). In DBPSK, the phase of the signal may be shifted in increments of 180° (i.e., by it radians) in order to encode a single bit of data ("1" or "0") with each phase shift. In another example, in Differential Quadrature Phase Shift Keying (DQPSK), the phase of the signal may be shifted in increments of 90° (i.e., by $\pi/2$ radians) in order to encode two bits of data (e.g., "11" or "01") with each phase shift.

The number of possible phase shifts is typically referred to as the number of "constellation points" of a modulation format. For example, DPSK has two constellation points, and DQPSK has four constellation points. Modulation formats using different number of constellation points (e.g., "m" constellation points) are also known, and are referred to generically as DmPSK formats.

If both the phase of the signal and the amplitude of the signal are used to encode the signal with the data, then the modulation format is called QAM (quadrature amplitude modulation) or m-QAM, where m is the number of constellation points.

A shift in the phase of the signal is referred to as transmitting a "symbol," and the rate at which each symbol is transmitted is referred to as the "symbol rate." As noted above, multiple bits of data may be encoded with each symbol. The rate at which bits are transmitted is referred to as the "bit rate." Thus, the symbol rate in a DQPSK system is half the bit rate. For example, a DPSK system and a DQPSK each transmitting at the same symbol rate would evidence different bit rates—the DQPSK system would have a bit rate that is twice the bit rate of the DBPSK system.

Accordingly, a 43 Gb/s data rate in a DQPSK system corresponds to 21.5 Giga symbols per second. Thus, DQPSK transmission systems have a narrower spectral bandwidth, greater chromatic dispersion tolerance and greater tolerance with respect to polarization mode dispersion (PMD) compared to traditional formats and compared to DBPSK. However, DQPSK transmission systems have approximately 1.5-2 dB worse receiver sensitivity than DBPSK transmission systems. Furthermore, both the transmitter and the receiver are significantly more complex than a traditional DBPSK transmitter/receiver.

DBPSK and DQPSK can be of the non-return-to-zero (NRZ)-type or, if a return-to zero (RZ) pulse carver is added to the transmitter, may be of the RZ-type.

FIG. 1A is a block diagram describing an example of optical network 100 for transmitting, among other things, a DPSK optical signal.

A transmitter 102 may generate a DPSK optical signal 104. The transmitter 102 may include, for example, a light source such as a laser. A pulse carver may accept light from the light source and add a pulse to the light. The pulsed beam may have a phase which can be manipulated by one or more modulators in order to encode a data signal on the light. The manipulated light may be a DPSK optical signal 104.

The DPSK optical signal 104 may be combined with one or more other signals 106, such as on-off-keyed (OOK) signals, at a multiplexer 107. For example, the signals may be multiplexed using wavelength division multiplexing (WDM), and two neighboring signals may have relatively similar wavelengths. By multiplexing the signals 104, 106 together and/or filtering the signals using one or more optical filters 108, more information can be carried over a transmission line 109. The filters 108 may include, for example, multiplexers, demultiplexers, optical interleavers, optical add/drop filters, and wavelength-selective switches. The filters 108 may spectrally narrow the signal passing therethrough.

The combined optical signal carried on the transmission line 109 may be received at a receiver 110 for demodulating the combined optical signal. Prior to the receiver 110, a demultiplexer 111 may receive a multiplexed signal. The demultiplexer 111 may select one of the signals, for example the DQPSK signal 104. The demultiplexer 111 may select the signal, for example, by isolating a particular wavelength carrying the DPSK signal 104. Alternatively, the receiver 110 may include a demultiplexer 111 or selector for receiving an incoming modulated optical signal.

The receiver 110 may receive a source beams 113. The source beam 113 is received at an interferometer 116.

DPSK receivers typically use one or more optical demodulators that convert the phase modulation of the transmitted optical signal into amplitude modulated signals that can be detected with intensity receivers. Typically, optical demodulators are implemented as delay line interferometers (DLIs) 116 that split the optical signal into two parts, delay one part relative to the other by a differential delay Δt, and finally recombine the two parts to achieve constructive or destructive interference depending on the phase which is modulated onto the optical signal at the transmitter 102. Thus, the interferometer may interfere a DPSK optical signal with itself.

The optical demodulator converts the DPSK phase-modulated signal into an amplitude-modulated optical signal at one output and into the inverted amplitude-modulated optical signal at the other output. These signals are detected with a photodetector 120, which may consist (for example) of two high-speed detectors (see, e.g., FIG. 1B). The outputs of the detectors are electrically subtracted from each other, and after that the resultant electrical signal is sent to the data recovery circuits.

In operation, the interferometer 116 shifts the phase of the incoming signal. For example, in a DPSK system, the interferometers 116, 118 may shift the phase of the incoming signals relative to each other by π. The interferometer 116 is used to analyze and/or demodulate the incoming modulated optical signal 102, and provide an outputs to a detector 120. The interferometer 116 is described in more detail below with reference to FIGS. 1B-1D.

The interferometer may generate one or more optical inputs for a detector 120. For example, the interferometer 116 may generate a first optical input 117 and a second optical input 118 that are provided to a photodetector 120. The photodetector 120 may operate on the input optical signals and generate an electrical output signal 124.

In some embodiments, the detector 120 may be, for example, a balanced detector or an unbalanced detector.

FIG. 1B is a block diagram of a portion of the receiver 110 of FIG. 1A. In the receiver 110, the interferometer 116 and photodetector 120 cooperate to turn a first optical source beam 113 in the optical domain into a first output signal 124.

At the interferometer 116, the optical source beam 113 is split into a sample beam 128 and a reference beam 130. The sample beam 128 and reference beam 130 are processed to generate a first optical input 117 and a second optical input 118, which are respectively received by first and second detectors 132, 134 in the photodetector 120. The first and second detectors 132, 134 include a first output port 136 and a second output port 138, respectively, for providing outputs to an electronic device. The electronic device may be, for example, a differential detector that subtracts the first output 136 from the second output 138 in order to generate the electrical output signal 124.

FIG. 1C is an example of an interferometer, such as, for example, interferometer 116. The interferometer 116 may be, for example, a delay line interferometer (DLI) which receives one of the signal components (e.g., the first source beam 113) from the splitter 112. The interferometer 116 may be fabricated, for example, in gallium arsenide or lithium niobate, free-space optics (e.g., FIGS. 1C and 1D), fiber (e.g., FIGS. 1B, 2, 3) or PLC. Other examples of interferometers include Mach-Zehnder interferometers (MZIs).

The interferometer 116 may include a first splitter 142 for splitting the received first source beam 113 into two or more interferometer signal components 128, 130. The first interferometer signal component 128 is referred to as the sample beam, and is provided to a first mirror 148 along an optical path 144. Likewise, a reference beam 130 is supplied to a second mirror 150 along a second optical path 146. The optical paths 144, 146 may include an optical medium through which the signals travel. For example, the optical paths 144, 146 may include air or glass. The optical properties of the medium in the optical paths 144, 146 affect the amount of time that it takes the signals 128, 130 to travel in the optical paths 144, 146.

From the mirrors 148 and 150, the respective interferometer signal components 128 and 130 are provided to another splitter 152, where the signal is further split into a pair of signals (a first optical input 117 and a second optical input 118), which are received by two or more detectors 132, 134.

If the optical paths 144, 146 (or other optical paths not pictured) are identical in length and other properties, then the sample beam 128 and the reference beam 130 arrive at the detectors 134, 136 at the same time. However, by varying one or more of the optical paths 144, 146 with respect to the other, a time delay can be introduced, as shown in FIG. 1D.

As depicted in FIG. 1D, the interferometer 116 may be unbalanced in that the interferometer has a time delay 154 (often referred to by the symbol "τ"), which in some situations may be equal to the symbol period (e.g., 50 ps for a 20 Gsymbol/s line rate) of the data modulation rate, in one optical path 144 relative to that of the other optical path 146. The time delay 154 affects the time at which each respective beam 128, 130 is received at the detectors 132, 134.

Using binary phase shift keying, the phase of a signal may be shifted in two different ways (by 0 or π). Accordingly, each phase shift can encode a signal having a bit of information (e.g., "0" or "1"). The symbol rate refers to the rate at which these "symbols" are transmitted in the network (e.g., the number of symbol changes made to the transmission medium per second), while the symbol period refers to the amount of time that it takes for a single symbol to be transmitted. For example, if it takes 46.5 ps (i.e., $4.65 \times 10^{-11}$ seconds) to transmit a single symbol, then the symbol period is 46.5 ps and the symbol rate is approximately $2.15 \times 10^{10}$ symbols per second (or 21.5 Gsymbol/s).

Conventional interferometers include a time delay 154 in order to determine the amount that a particular signal has been phase shifted. Conventionally, the time delay 154 may be set to (for example) one symbol period in order to aid in the interpretation of the phase shifted signal. However, the time delay 154 may also be set to be larger or smaller than the symbol period, as discussed in U.S. patent application Ser. No. 12/906,554, entitled "Method And System For Deploying An Optical Demodulator Arrangement In A Communications Network" and filed Oct. 18, 2010, the contents of which are incorporated herein by reference.

In the "classical" implementation of DPSK receivers, the time delay 154 between the two arms of the interferometer is an integer number of the time symbol slots of the optical DPSK data signal: Δt=n T (where n=1, 2, . . . T; T=1/B is the symbol time slot; and B is the symbol bit-rate).

The time delay 154 may be introduced by making the optical path length of the two optical paths 144, 146 different, or may be introduced by varying the medium through which one of the signals 128, 130 travels, among other things. For ease of fabrication, the time delay 154 may be introduced by making the physical length of the interferometer's 116 optical path 144 longer than the physical length of the other optical path 146.

The interferometer 116 is respectively set to impart a relative phase shift 156 by the application of an appropriate voltage to electrodes on the shorter optical path 146. The amount of the phase shift 156 may be determined, for example, based on the modulation format. In the example of DQPSK, the relative phase shift 156 may be π/4 or −π/4. In the example of DPSK, the relative phase shift 156 may be π or 0. A more detailed description of the interferometers and time delay can be found in U.S. patent application Ser. No. 10/451, 464, entitled "Optical Communications," the contents of which are incorporated herein by reference.

Changing the amount of time delay 154 can change the Free Spectral Range (FSR) of the interferometer 116. The FSR relates to the spacing in optical frequency or wavelength between two successive reflected or transmitted optical intensity maxima or minima of, for example, an interferometer.

An FSR of an interferometer may be modified in accordance with a change in the optical bandwidth of the optical signal passing through the interferometer. Until recently, it was a common understanding that the best performance (best optical signal-to noise ratio OSNR sensitivity) is obtained when the time delay between the two arms of the interferometer $\Delta t$ is exactly an integer number of the time symbol slots of the optical DPSK/DQPSK data signal, and the penalty increases rapidly (~quadratically) when $\Delta t$ deviates from its optimal value (see, for example, Peter J. Winzer and Hoon Kim, "Degradation in Balanced DPSK receivers", IEEE PHOTONICS TECHNOLOGY LETTERS, vol. 15, no. 9, page 1282-1284, September 2003). In other words, according to conventional theory the optimum FSR (FSR=1/$\Delta t$) of the DLI equals 1/nT, and (in case of n=1) equals the symbol rate of the signal.

The performance of DPSK modulated optical networks considerably reduces when the signal is spectrally narrowed (for example, after going through optical multiplexers/demultiplexers, optical interleavers, optical add/drop filters, wavelength-selective switches or other filters 108, when the symbol rate B is comparable to the channel spacing in WDM transmission, etc). To improve performance of DPSK/DQPSK in such bandwidth-limited transmission, a concept of Partial DPSK (P-DPSK) was introduced: by making the time delay between the two arms of the delay interferometer $\Delta t$ smaller than the symbol size T (or, equivalently, making the DLI FSR larger than the symbol rate: FSR>1/T), the performance of the optically-filtered DPSK was considerably improved (see, e.g., U.S. patent application Ser. No. 11/740,212, entitled "Partial DPSK (PDPSK) Transmission Systems" and filed on Apr. 25, 2007, the contents of which are incorporated herein by reference). It was shown that depending on the amount of the signal spectral filtering in the transmission system, an optimum FSR of the DLI exists, and this optimum FSR is different for different strength of optical filtering.

Nevertheless, in practical systems the receiver should be able to operate in conditions with different amount of the signal spectral filtering in the transmission line: for example, the combined optical bandwidth of systems with reconfigurable optical add/drop multiplexers (ROADMs) can change dramatically depending on the number of ROADMs in the system and the ROADMs settings. The receiver settings need to be optimized depending on the conditions (for example, noise, signal strength, optical filtering etc) in the transmission line. This requirement becomes more important in reconfigurable networks, where the transmission distance and the amount of optical filtering in the system may change dramatically during the operation.

A traditional approach to control the receivers is to provide a feedback from a forward correction (FEC) chip and adjust the receiver parameters to the minimum possible bit-error-ratio (BER) provided by the FEC chip. FIG. 2 depicts an example of a system employing FEC to adjust characteristics of the receiver.

In a FEC scheme, redundant data such as error correcting code (ECC) may be transmitted over the transmission line. The ECC may be predetermined and previously programmed into a detection unit located at the receiver. The ECC may be received at the receiver 110 together with a payload of the signal. A power supply 210 powers the balanced detector 120, which accepts the output of the photodetectors 132, 134 and subtracts them in a differencing unit 212 to interpret the signal. The differencing unit may be, for example, a transimpedance amplifier (TIA). Hence, the detector 120 may be a differential detector that outputs an analog electrical signal.

The resulting demodulated signal is provided to a clock and data recovery (CDR) unit 240, which is controlled by an FEC detection unit 220 and control unit 230. Note that if a limiting amplifier is used before the CDR, the amplifier is considered part of the CDR circuit because an amplitude decision is made by the amplifier.

The CDR circuit converts the receiving analog electrical signal into a digital electrical signal. The CDR circuit measures the voltage of the input signal and makes a bit-by-bit decision: "1" if the symbol voltage is higher (or equal) than the decision threshold (DT) voltage, and "0" if the voltage is lower than the DT voltage. The decision phase (or timing) is the position within the bit (symbol) time slot at which the voltage measurements take place.

The FEC detection unit 220 detects the ECC, calculates the number of errors (BER), and instructs the control unit 230 to adjust the settings of the CDR to reduce the BER.

Although this technique effectively lowers the BER, it carries a number of drawbacks. For example, it is the characteristic of the receiver which must be adjusted; however, the ECC is generated by the transmitter and the detection unit for interpreting the ECC is typically located outside of the receiver. At best, this may mean that a communications path needs to be provided between the detection unit and the receiver, which increases the response time between interpreting the ECC and applying a change to the receiver characteristic. At worst, the transmitter and detection unit may not be set up to provide FEC at all, and therefore this information is simply not available to the receiver.

Even when such FEC information is available to the receiver, using the FEC error signal can be an inefficient way to adjust receiver settings. For example, if an adjustment is made to a characteristic of the receiver and the BER is observed to decrease, it is possible that the change to the characteristic improved the BER (and hence should be maintained). However, it is also possible that a condition in the transmission line, and not the receiver, changed the BER. Accordingly, the change to the receiver settings may not have affected the BER, or may have actually degraded the signal quality. Additionally, as the BER approaches zero, small changes to the receiver settings may have a disproportionately large effect on the BER, or may have no observable effect at all. In this case, the use of FEC to tune the receiver settings becomes difficult or impossible.

Accordingly, reliance on FEC can be an inefficient and undesirable characteristic of an optical receiver.

SUMMARY OF THE INVENTION

The present invention determines a value for characteristics of an optical receiver based on an amount of optical filtering on a communications link which transmits the signal. The present inventors have discovered that, unexpectedly, the optimum settings for the receiver are highly dependent on the amount of optical filtering in the transmission line, and the amount of optical filtering in the transmission line can be estimated based on data available at the receiver.

For example, the value for the characteristics of the receiver may be determined by observing a characteristic of a detector associated with the receiver, such as a ratio of the average photocurrents of the constructive and destructive ports of the detector. The observed characteristic of the detector may be mapped to a predetermined value for the characteristic of the receiver in a lookup table, which may be queried during operation of the receiver. Based on the predetermined value, the settings of the receiver may be adjusted to improve the performance of the receiver.

According to exemplary embodiments of the present invention, a receiver for demodulating a DPSK optical signal is provided. The receiver may include an optical interferometer coupled to receive the DPSK optical signal and interfere the DPSK optical signal with itself. The optical interferometer may include a constructive output port for outputting a first signal, and a destructive output port for outputting a second signal. For example, the optical interferometer may be a Differential Interferometer (DI) or a Mach-Zehnder Interferometer (MZI).

The optical interferometer may be connected to a differential detector for providing an analog electrical signal responsive to a difference between the first signal and the second signal. The differential detector may include a first photodetector coupled to the constructive port of the interferometer to receive the first signal and generate a first photocurrent, and a second photodetector coupled to the destructive port of the interferometer to receive the second signal and generate a second photocurrent.

The receiver may further be provided with a clock and data recovery (CDR) module for converting the electrical signal provided by the differential detector into a digital electrical output signal. The CDR may be associated with one or more characteristics, such as a decision threshold (DT) and a decision phase for determining whether a symbol is encoded in a data stream received by the receiver.

The receiver may further include a receiver optical power calculation module for calculating a ratio of the first photocurrent to the second photocurrent and a lookup table stored in an electronic device readable storage medium. The lookup table may store calibration data that relates the ratio of the first signal to the second signal to a predetermined value for the characteristic of the receiver. A receiver characteristic adjustment module may adjust the characteristic of the receiver based on the predetermined value stored in the lookup table. The characteristic of the receiver the characteristic of the receiver may include, for example, a DT of the CDR, a decision phase of the CDR, an electrical bandwidth of the receiver, and a free spectral range (FSR) of the interferometer.

In some embodiments of the present invention, a method for adjusting a characteristic of an optical receiver is provided. The method may include determining an amount of optical filtering applied to an optical signal received at the receiver, the amount of optical filtering representing a narrowing or a widening of an optical bandwidth during a transmission of the optical signal. The optical signal may be received from an optical link, and the optical filtering may be applied by one or more optical filters or multiplexers present on the link. The optical signal may be a modulated optical signal modulated according to one of the following formats: mPSK, DPSK, DmPSK, PDPSK, PDmPSK, mQAM, and ODB.

Determining the amount of optical filtering applied to the optical signal may include determining a characteristic of a detector associated with the receiver. For example, the characteristic may be one of: an average photocurrent of a constructive port of the detector; an average photocurrent of a destructive port of the detector; a sum of the average photocurrents of the constructive and destructive ports of the detector; and a ratio of the average photocurrents of the constructive and destructive ports of the detector. The amount of optical filtering may be selected based on the determined characteristic of the detector.

The method may further include determining a value for the characteristic of the receiver based on the determined amount of optical filtering Based on the determined value of the characteristic, the receiver may be configured. In other embodiments of the present invention, an amount of optical filtering in an optical link may be estimated for uses other than configuring the receiver.

In other embodiments, a method of calibrating a characteristic of an optical receiver is provided. Calibrating the receiver may include determining an amount of optical filtering applied to an optical signal received at the receiver, determining a value for the characteristic of the receiver based on the measured amount of optical filtering, and storing the determined value in a non-transitory electronic device readable medium associated with the receiver.

The value of the characteristic may be determined, for example, by minimizing a bit error rate (BER) associated with the optical signal. In other embodiments, the value may be determined by observing a characteristic of a detector associated with the receiver. The characteristic may represent, for example, an average photocurrent of the constructive port of the detector, an average photocurrent of the destructive port of the detector, a sum of the average photocurrents of the constructive and destructive ports of the detector, or a ratio of the average photocurrents of the constructive and destructive ports of the detector. The observed characteristic may be maximized or minimized.

Using the techniques described herein, the amount of optical filtering in the optical network can be estimated at the receiver and used for a variety of purposes. For example, using the estimated amount of optical filtering, the receiver can be configured for improved performance without relying on FEC.

BRIEF DESCRIPTION OF THE FIGURES

In the Figures, the same reference numbers are used to refer to the same elements throughout.

FIG. 1A is a schematic block diagram of a conventional optical network 100.

FIG. 1B is a schematic block diagram of a portion of the receiver 110 of the optical network 100 of FIG. 1A.

DETAILED DESCRIPTION OF THE INVENTION

Optical communication networks rely on optical receivers to demodulate optical signals and convert the demodulated optical signal into an electrical signal. Optical receivers may be associated with one or more characteristics which can be made to vary during a transmission of an optical signal in order to improve the quality of the received signal. To achieve the optimum performance (i.e., minimum BER), the parameters of the receiver data recovery (for example, the DT voltage and the decision phase/timing) should be properly set. Another important receiver parameter that may be optimized, depending on the transmission line conditions, is the electrical bandwidth (BW) of the receiver.

The present invention estimates an amount of optical filtering (and hence, an optical bandwidth of an optical signal) in an optical communication network. The amount of the optical filtering may be representative of, for example, a narrowing or a widening of an optical bandwidth by one or more optical filters and/or multiplexers during a transmission of the optical signal. The transmission line may also change due to the addition or subtraction of optical filters in the line, or due to the use of a different transmission path from the transmitter to the receiver. Based on the estimated amount of optical filtering, a value for the operating characteristics of a receiver may be determined. For example, the value for the characteristics of the receiver may be determined by observing a characteristic of a detector associated with the receiver, such as a ratio of the average photocurrents of the constructive and destructive ports of the detector. The observed characteristic of the detector may be mapped to a predetermined value for the characteristic of the receiver in a lookup table, which may be queried during operation of the receiver.

Figure 1C:
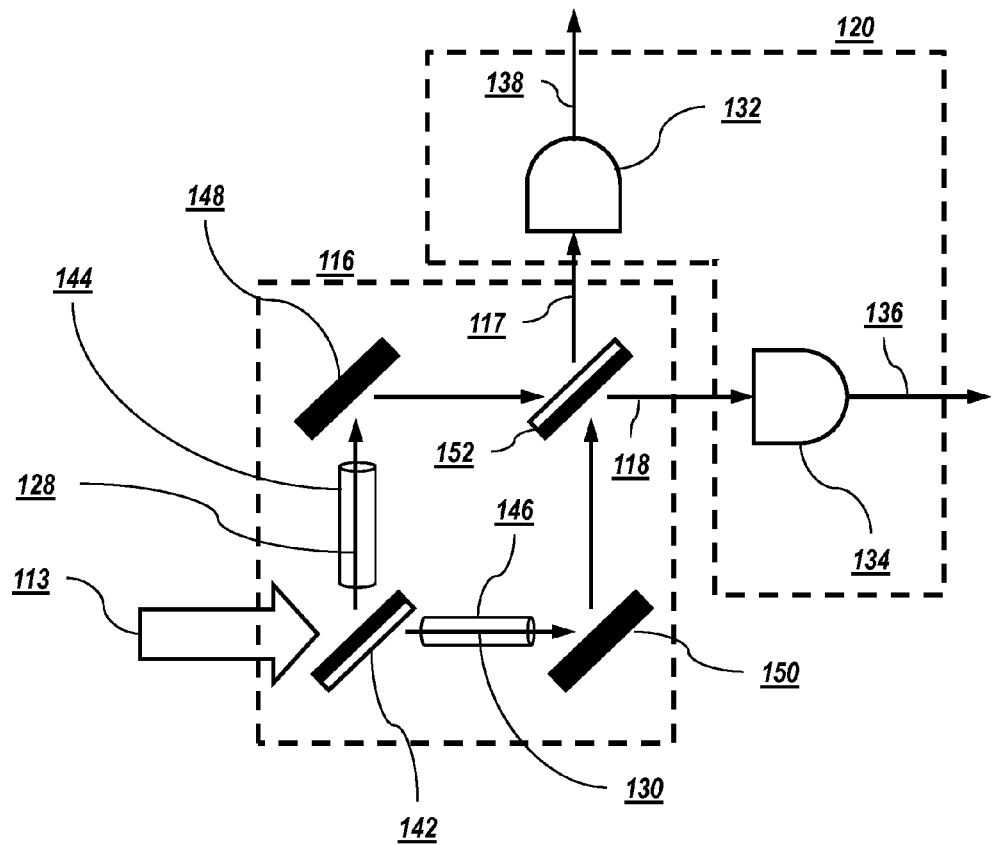
FIG. 1C depicts a portion of the interferometer 116 and photodetector 118 of FIG. 1A.
Figure 1D:
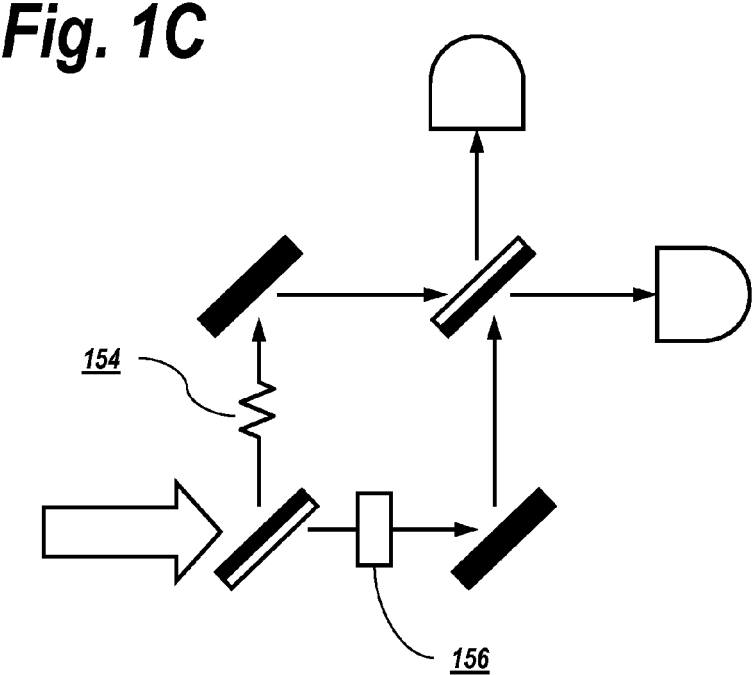
FIG. 1D depicts further aspects of the interferometer 116.
Figure 2:
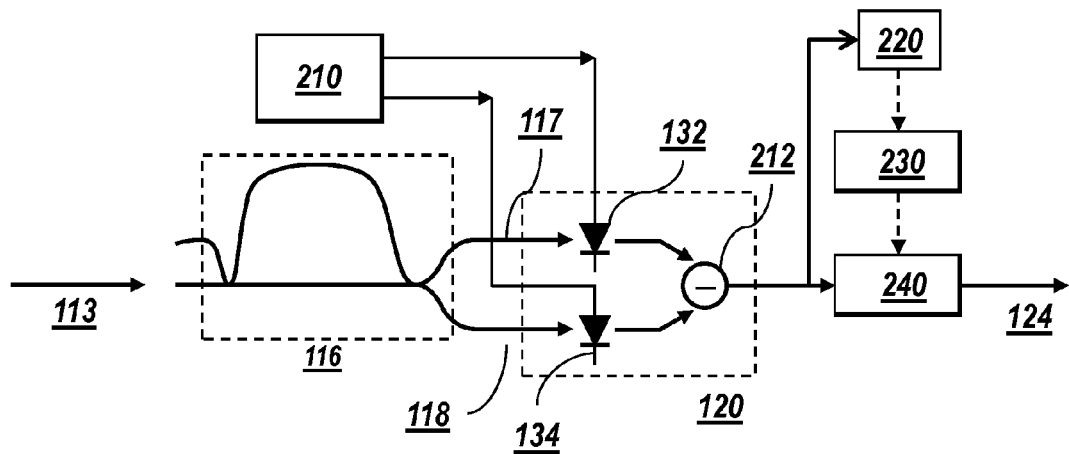
FIG. 2 is a block diagram depicting a system using forward error correction (FEC) to adjust receiver parameters.
Figure 3:
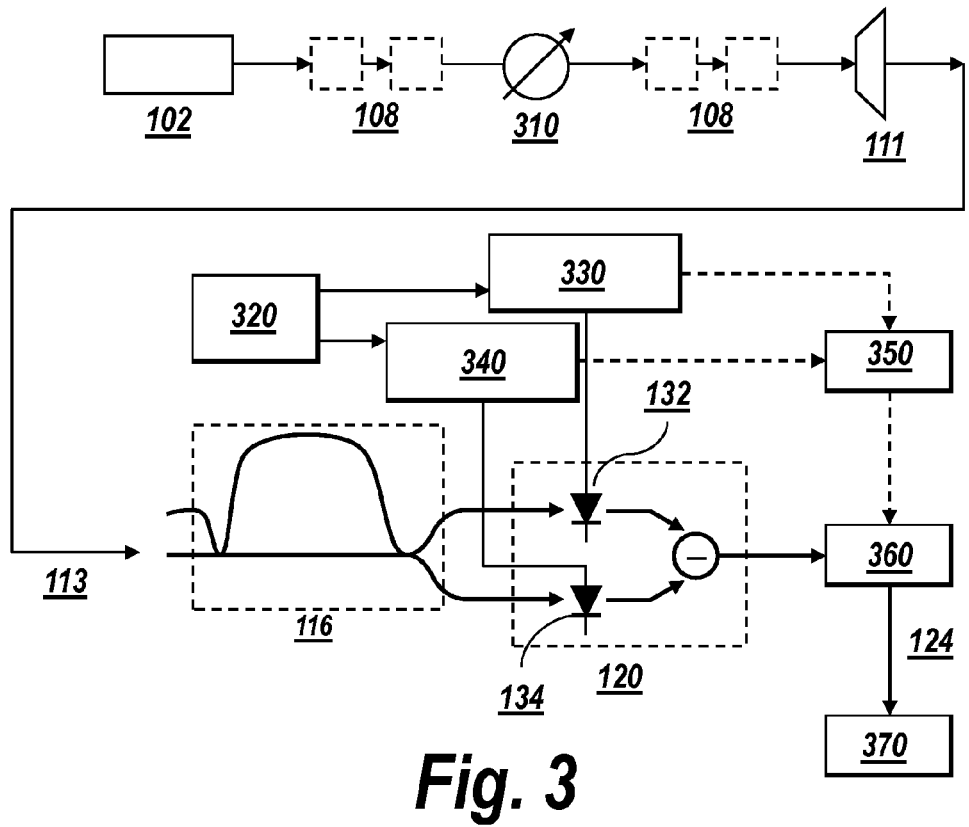
FIG. 3 is a block diagram depicting an experimental setup establishing that the preferred settings of the receiver are affected by the amount of optical filtering in an optical transmission line, according to the teachings of the present invention.

FIG. 3 is a block diagram depicting an experimental setup establishing that the preferred settings of the receiver are affected by the amount of optical filtering in an optical transmission line. As shown in FIG. 3, a signal from a 43 Gbps DPSK transmitter 102 passes through the optical filters 108 and the noise-loading system 310 before being received by a DPSK receiver. By changing the number of cascaded optical filters 108 in the experiments, the inventors were able to vary the combined effective optical bandwidth of the transmission.

The receiver consists of a DLI 116 followed by a balanced receiver 120 that is connected through a CDR circuit 360 to a BER counter 370. A controller 350 controls the settings of the CDR 360.

The average photocurrents in the photodiodes 132, 134 of the balanced receiver 120 were measured using first and second measurement devices 330, 340 connected to a power supply 320 and the photodiodes 132, 134, respectively.

With different amounts of optical filtering and the OSNR in the transmission line, the CDR circuit settings (decision threshold DT, phase, receiver electrical BW, etc.) were optimized through the controller 350 by minimizing the BER. The results of the experiment are depicted in FIGS. 4A-4B.

Figures 4A, 4B:
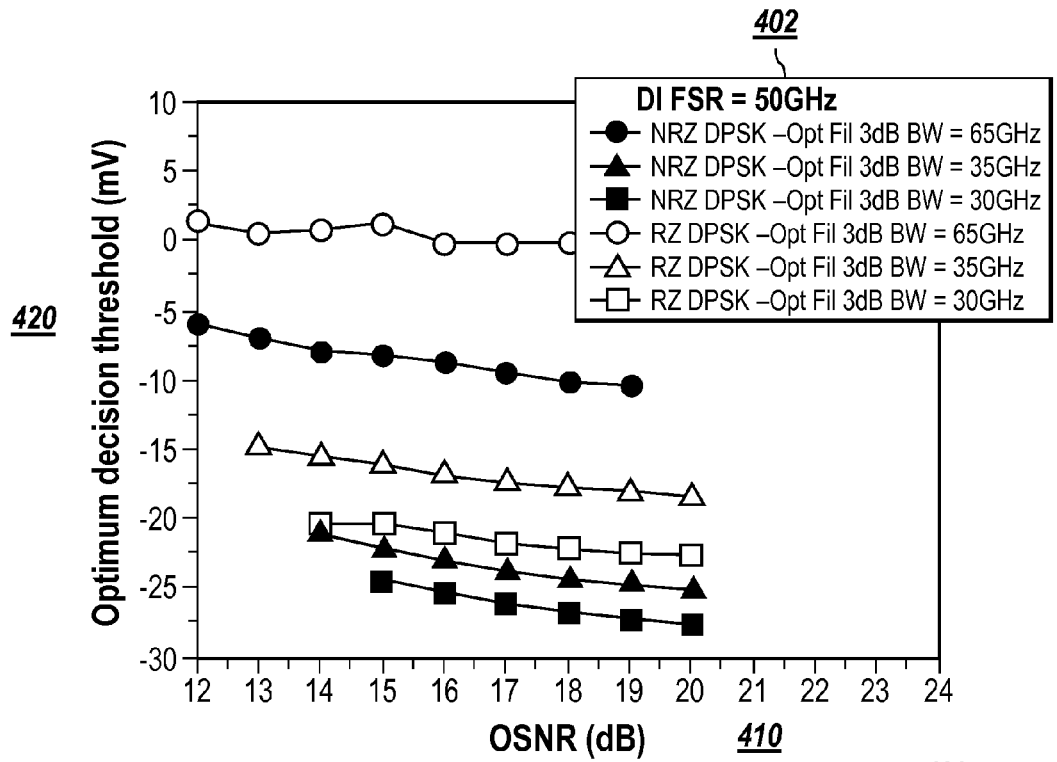
FIG. 4A is a graph depicting the optimal decision threshold vs. the optical signal to noise ratio for interferometers having a free spectral range of 50 GHz based on an experiment carried out using the apparatus depicted in FIG. 3.
FIG. 4B is a graph depicting the optimal decision threshold vs. the optical signal to noise ratio for interferometers having a free spectral range of 66 GHz based on an experiment carried out using the apparatus depicted in FIG. 3.

FIG. 4A is a graph 400 depicting the results of an experiment carried out using the apparatus depicted in FIG. 3. The graph 400 depicts experimental results performed using a system whereby the DLI 116 uses a free spectral range (FSR) 402 of 50 GHz for various amounts of optical filtering. FIG. 4B is a graph 430 depicting the results of an experiment carried out using the apparatus depicted in FIG. 3 for a DLI 116 having an FSR 432 of 66 GHz for various amounts of optical filtering.

The x-axis 410 of the graphs 400, 430 depict the Optical Signal to Noise Ratio (OSNR) for the system, while the y-axis 420 depicts the optimum decision threshold (DT) value for each of the six combinations of variables described. These combinations were established by varying whether the system of FIG. 3 utilized non-return to zero (NRZ) or return-to-zero (RZ) DPSK, and by varying the optical bandwidth of the system between 30, 35 and 65 GHz.

The optimum DT voltage and phase correspond approximately to the center of the "eye opening" of the signal eye diagram at the receiver. Measured shapes of the eye diagrams depend on the optical filtering in the transmission line and on the receiver DLI FSR. As a consequence, the optimal receiver settings also change.

An important observation from comparing FIGS. 4A and 4B is that, for a specific modulation format and specific receiver DLI FSR, the optimum CDR settings are strongly dependent on the amount of optical filtering in the transmission line. At the same time, the dependence on the optical signal to noise ratio (OSNR) is weak. Thus it is possible to avoid using the FEC statistics to optimize the receiver and to calibrate the receiver for different optical filtering conditions (i.e., measure and store the optimal CDR settings according to the optical filtering). During the receiver operation, if the amount of optical filtering is known, the optimal CDR parameters can be set without using the FEC statistics.

However, in practical systems the receiver should be able to operate in conditions with different amounts of the signal spectral filtering in the transmission line: for example, the combined optical bandwidth of systems with reconfigurable optical add/drop multiplexers (ROADMs) can change dramatically depending on the number of ROADMs in the system and the ROADM settings. Thus the receiver should be able to "measure" the optical filtering in the link. Such receiver measurements are described below with reference to FIGS. 5A-6.

Figure 5A:
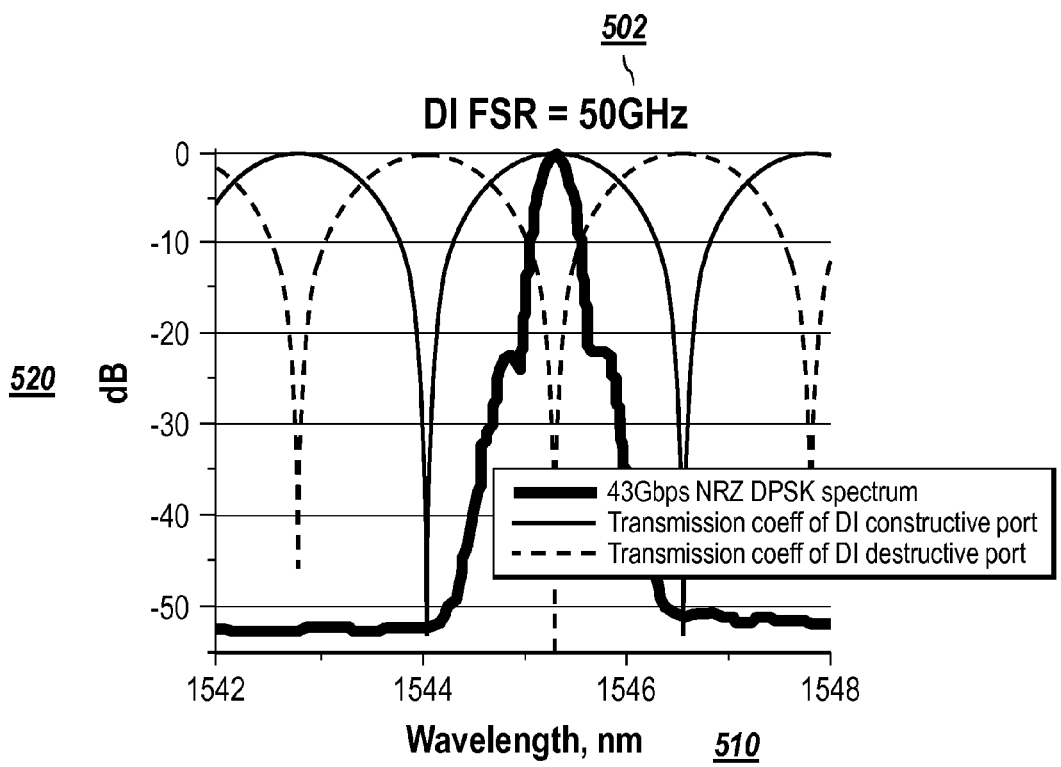
FIG. 5A is a graph depicting the transmission coefficients for the outputs of an interferometer having a free spectral range of 50 GHz.
Figure 5B:
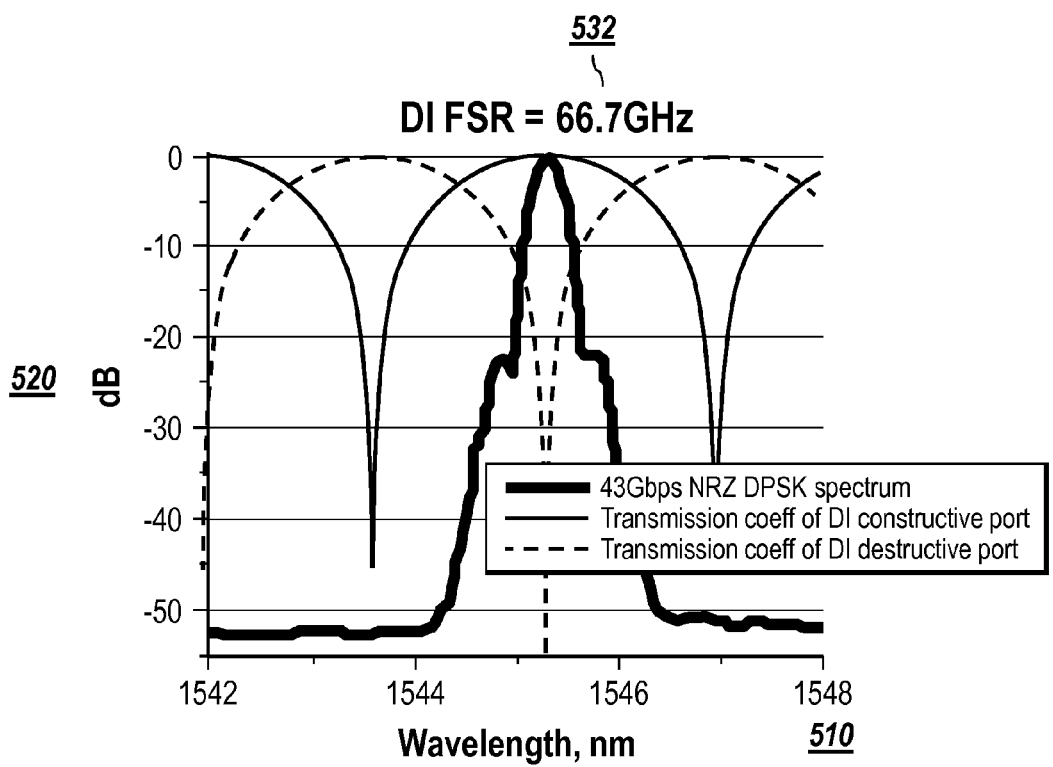
FIG. 5B is a graph depicting the transmission coefficients for the outputs of an interferometer having a free spectral range of 66 GHz.

FIGS. 5A and 5B are graphs 500 and 530, respectively, depicting the sinusoidal transmission curve of the two outputs 117, 118 of the DLI 116. The graph 500 depicts the transmission for a DLI FSR 502 of 50 GHz, while the graph 530 depicts the transmission for a DLI FSR 532 of 66.7 GHz. The graphs 500, 530 compare the wavelength of the transmitted signal on the x-axis 510 to the spectrum and transmission coefficients of the transmitted signal on the y-axis 520.

The two outputs 117, 118 of the DLI 116 can be viewed as the outputs of two optical filters with sinusoidal transmissions (where the period of the sinusoid is the DLI FSR) shifted with respect to each other by one half of the FSR. The positions of the sinusoids can be tuned. With the optimal DLI tuning, one of the transmission peaks of the DLI constructive port coincides with the center of the received signal spectrum and one of the transmission minima of the DLI destruction port coincides with the center of the received signal spectrum. As a result, the constructive port transmits mostly the central portion of the signal spectrum, while the destructive port transmits mostly the tails of the signal spectrum. For a narrower spectrum, a smaller contribution from the spectrum is present in the tails of the spectrum. Consequently, the relative optical power in the constructive and destructive ports of the DLI can indicate the signal spectral width and (because the spectral bandwidth at the transmitter is known) therefore the amount of spectral filtering in the transmission line.

Figure 6:
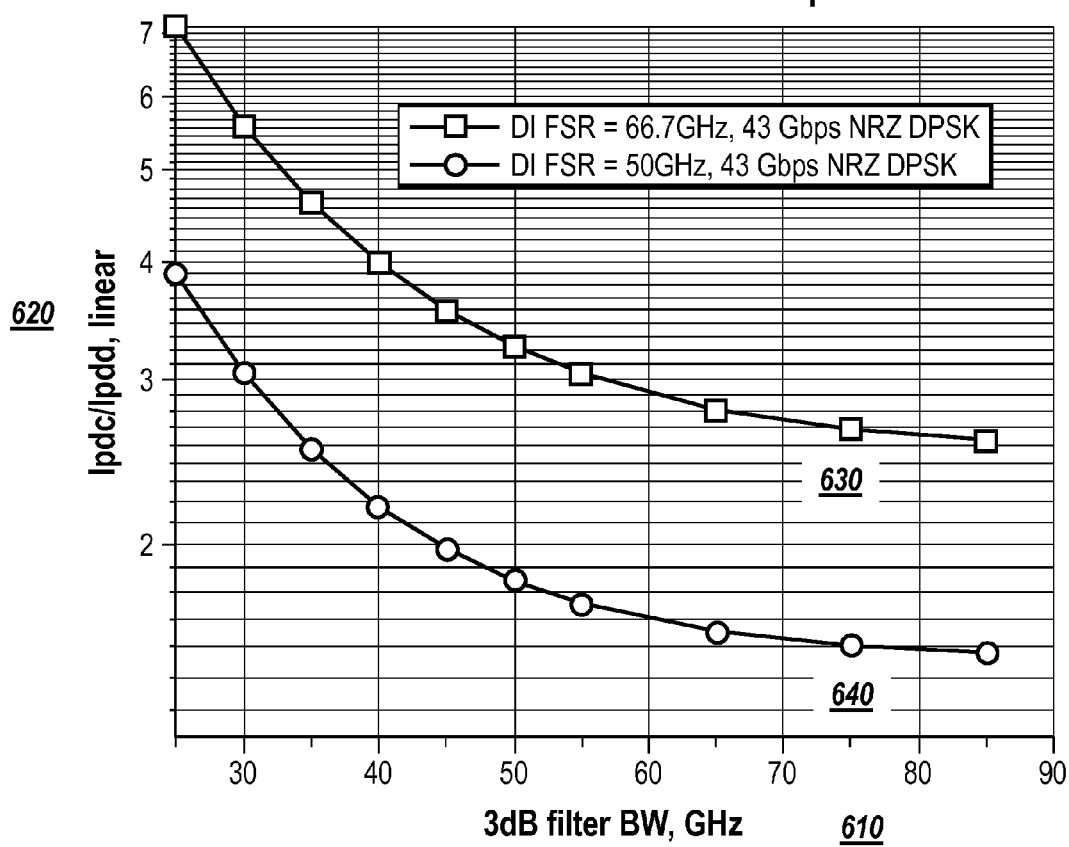
FIG. 6 is a graph depicting the ratio of diode photocurrents for the constructive and destructive ports of an interferometer vs. the bandwidth of a transmission line.

Such a relative optical power is depicted in the graph 600 of FIG. 6. The average photocurrents 620 generated by the two photodiodes 132, 134 of the balanced receiver 120 (Ipdc and Ipdd, respectively) are proportional to the optical power in the constructive and the destructive ports of the DI, and hence the ratio of the photocurrents (Ipdc/Ipdd) at the constructive and destructive ports is a good measure of the optical filtering 610 in the transmission line. FIG. 6 shows the dependence of the ratio Ipdc/Ipdd on the optical filtering for the cases of DLI FSR=50 GHz (640) and DLI FSR=66.7 GHz (630).

By measuring the average currents of the two photodiodes of the balanced receiver the optical filtering in the line is easily calculated (assuming the DLI FSR and the modulation format of the signal are known). It should be noted that the noise in the system only slightly affects the accuracy of the estimation of the optical filtering. Also, the sum of the currents Ipdc+Ipdd corresponds to the total input optical signal at the receiver 110.

Figures 7A, 7B:
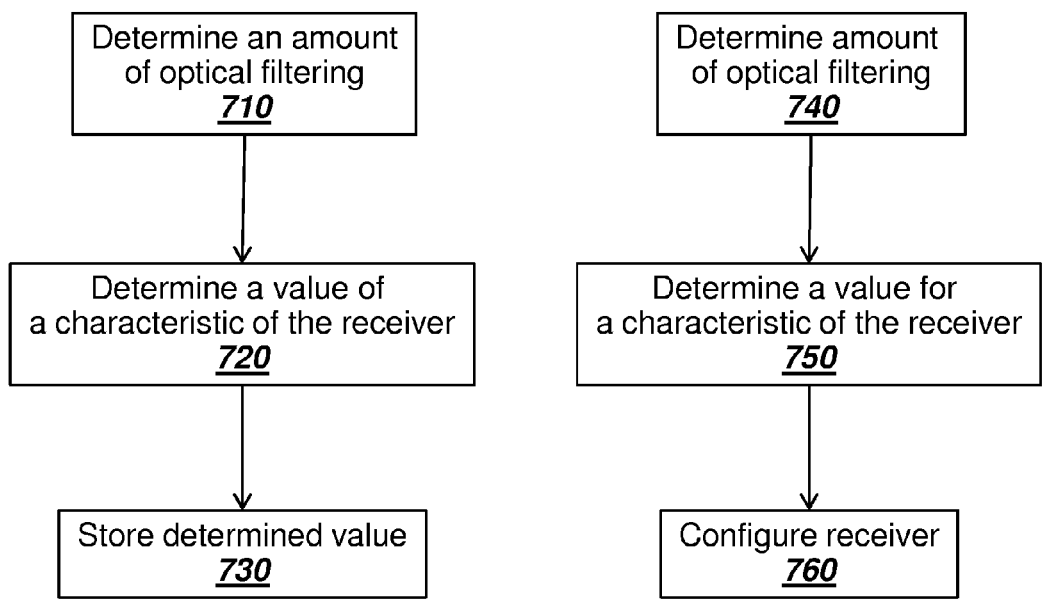
FIG. 7A is a flowchart depicting an exemplary technique for calibrating an optical receiver.
FIG. 7B is a flowchart depicting an exemplary technique for configuring an optical receiver

These results provide the basis for a method for calibrating and configuring a receiver based on an estimated amount of optical filtering in the network. For example, FIG. 7A is a flowchart depicting an exemplary technique for calibrating an optical receiver.

At step 710, an amount of optical filtering in the network is estimated or determined. Because an optical receiver is typically calibrated while at a factory or in lab-like conditions, the optical receiver may be employed in a facility where the receiver can be tested using a network with a known amount of optical filtering. Accordingly, the amount of optical filtering can be either measured or determined directly based on the specific number and type of optical filters in the network.

At step 720, an optimal or desired value for a characteristic of the receiver may be determined. For example, the optimal or desired value of the characteristic may be determined by monitoring a BER of the receiver using FEC and adjusting the characteristic to minimize the BER or reduce the BER below an acceptable threshold.

Alternatively, the optimal or desired value may be determined using a simulation or from previously collected data. If the receiver operates with varying optical signal input power, the optimal settings may also be calibrated for different input optical signal power values.

Exemplary characteristics of the receiver which may be determined at step 720 include, but are not limited to, a decision threshold (DT) of the CDR, a decision phase of the CDR, an electrical bandwidth of the receiver, settings of a limiting transimpedance amplifier (TIA) if used, DLI FSR if the FSR can be changed, loss imbalance between the two DLI ports, etc.

Once an appropriate BER is achieved, the value corresponding to the BER may be stored in a database, lookup table, or other form of persistent storage. The database or lookup table may be programmed into the receiver or otherwise made available to the receiver during operation. The database or lookup table may be consulted during operation of the receiver, as described below with respect to FIG. 7B.

FIG. 7B is a flowchart depicting an exemplary technique for configuring an optical receiver during operation without relying on FEC. At step 740 the amount of optical filtering in the network may be estimated. The amount of optical filtering may be estimated, for example, using a method such as the one depicted in FIG. 7C.

At step 750, a value for a characteristic of the receiver may be determined. For example, the receiver may consult a lookup table or database using the determined amount of optical filtering as an index key. A value for the characteristic may be associated with the index key in the lookup table. The receiver may retrieve the value for the characteristic and, at step 760, apply the value for the characteristic to configure the receiver. Advantageously, such a control does not require dithering of the parameters.

Figure 7C:
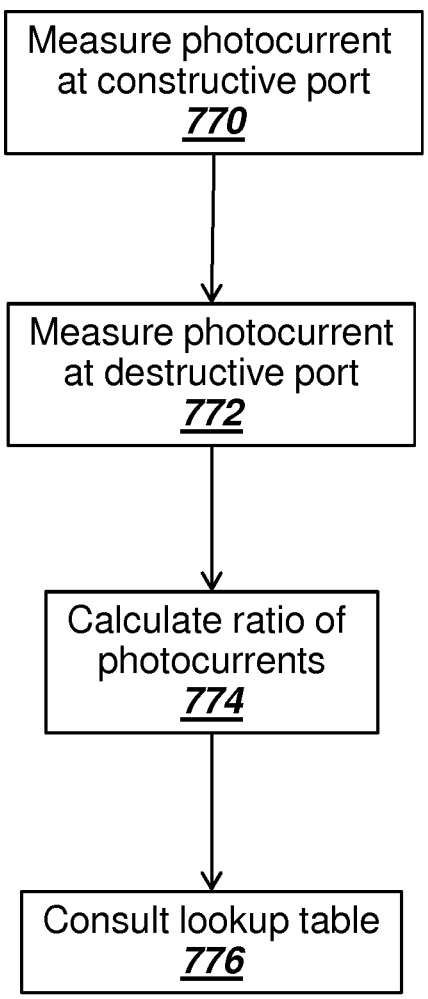
FIG. 7C is a flowchart depicting an exemplary technique for determining an amount of optical filtering in a network and selecting an appropriate receiver setting based on the determined amount of optical filtering.

FIG. 7C is a flowchart depicting an exemplary technique for determining an amount of optical filtering in a network and selecting an appropriate receiver setting based on the determined amount of optical filtering.

At step 770, the photocurrent of the photodiode 132 at the constructive port of the interferometer 116 (Ipdc) may be measured. An average value of the photocurrent of the photodiode 132 may also be utilized. Similarly, at step 772, the photocurrent of the photodiode 134 at the destructive port of the interferometer 116 (Ipdd) may be measured. An average value of the photocurrent of the photodiode 134 may also be utilized.

At step 774, the ratio of the photocurrents (Ipdc/Ipdd) may be calculated. At step 776, the ratio of the photocurrents may be utilized as a key to query the lookup table for the appropriate value of the receiver characteristic.

Figure 8:
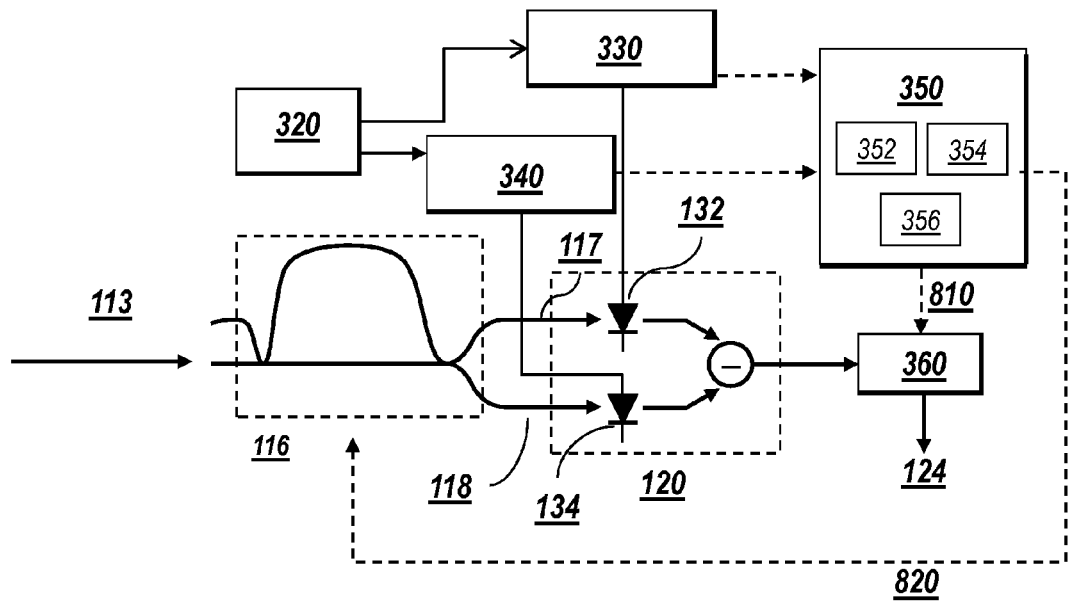
FIG. 8 is a block diagram depicting a receiver employing a control loop for adjusting receiver settings in response to a calculated amount of optical filtering in an optical network.

As shown in FIG. 8, steps 770-774 may be performed by a receiver optical power calculation module 852, an optical filtering estimation module 854, and/or a receiver characteristic adjustment module 856. Such modules may be embodied separately as hardware devices, software modules, or control logic, or may be integrated as a controller 350.

Instructions for estimating the amount of optical filtering in an optical network and determining the desired settings of the receiver may be encoded on a non-transitory electronic device readable storage medium holding one or more electronic device readable instructions. For example, the non-transitory electronic device readable storage medium may include RAM, ROM, flash memory, a computer hard drive, a CD, DVD, or computer disk, or any other suitable type of electronic device readable storage media. The instructions may be embodied as control logic which is employed in hardware or software.

The above-described methods may be employed in an apparatus for adjusting the characteristics of a receiver based on an amount of optical filtering in a network. For example, FIG. 8 is a block diagram depicting a receiver employing a control loop for adjusting receiver settings in response to a calculated amount of optical filtering in an optical network.

In FIG. 8, the controller 350 receives input signals from the first and second measurement devices 330, 340, and calculates a ratio of the photocurrents of the photodiodes. Based on the ratio, a suitable value for a characteristic of the receiver is selected.

The controller is further provided with two output paths 810, 820, for applying the value for the characteristic to the receiver. The first output path 810 connects the controller 350 to the CDR 360. Accordingly, settings of the CDR 360, such as the DT of the CDR, may be adjusted through the output path 810. The second output path 820 connects the controller 350 to the interferometer 116. Accordingly, settings of the interferometer, such as the loss imbalance between the interferometer 116 ports and/or the free spectral range (FSR) of the interferometer, may be adjusted or selected. Further output paths may be provided between the controller and other receiver components, such as transimpedance amplifiers (TIAs), the balanced detector 120, etc, for varying the characteristics of the other receiver components.

Figure 9:
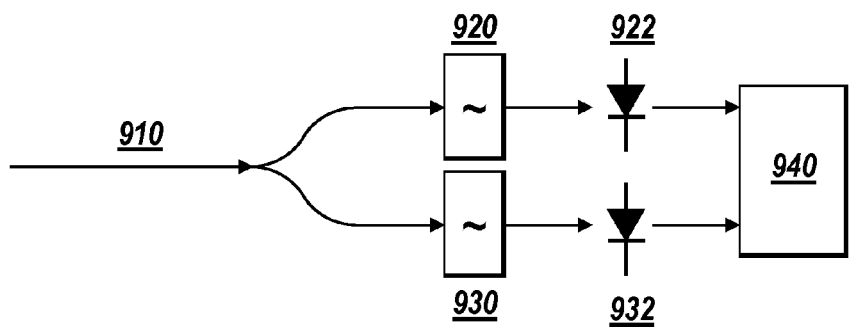
FIG. 9 is a block diagram depicting an apparatus for estimating optical signal bandwidth.

As described above, the amount of optical filtering in the network may be estimated as a part of the receiver to vary the characteristics of the receiver and thereby lower the BER associated with the receiver. However, the amount of optical filtering in the network may be useful in other contexts as well. Exemplary embodiments of the present invention further provide an apparatus for estimating an optical signal bandwidth, as shown for example in FIG. 9.

In order to measure the bandwidth of an optical signal 910, the optical signal 910 may be split into two paths. The signal in each of the two paths may then be transmitted through a corresponding optical filter 920, 930.

The transmission bands of the two filters 920, 930 in the branches are shifted with respect to each other. For example, the DLI interferometer 116 can be considered to be a signal splitter and two optical filters 920, 930. In this case, the transmission of each filter 920, 930 has a sinusoidal transfer function with the period of DLI FSR, and the transmission bands of the two filters are shifted with respect to each other by DLI FSR/2.

Then, comparing the optical powers of the optical signals at the outputs 922, 932 of the two filters, the optical bandwidth of the input optical signal is estimated by an optical signal bandwidth estimation unit 940 based on previously-established calibration values. The calibration depends on the actual transfer function of the two filters. Note that low-speed photodiodes can be used for the power measurements.

Such a simple optical BW measurement technique can be used for a variety of applications (for example, not only in a DPSK receiver but also in other modulation format receivers). Note that differences in the photodiode responsivities and in the loss in constructive and destructive ports (intentional or non-intentional) should be taken into account in the calibration.

Figure 10:
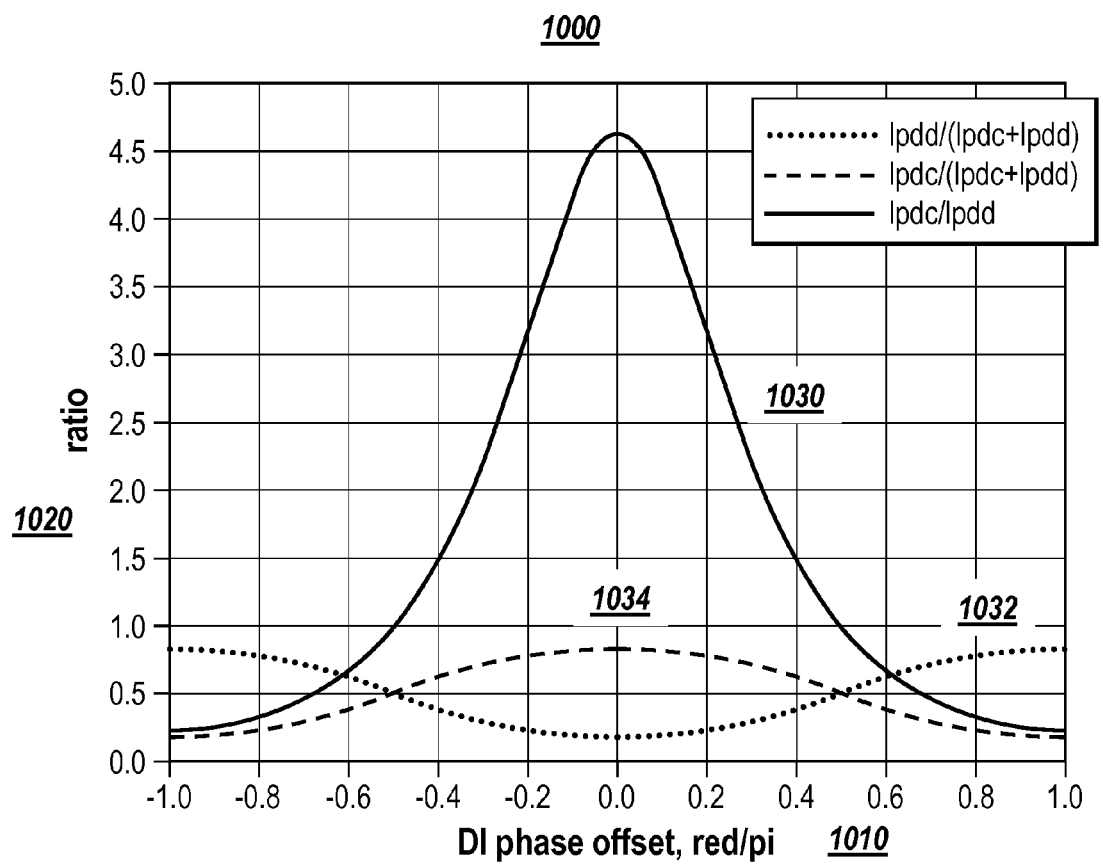
FIG. 10 is a graph depicting the dependencies of photodiode currents as a function of detuning of the interferometer phase from the optimum tuning.

Another aspect of the current invention is the control of the DLI phase (relative phase between the two branches of the interferometer). Accordingly, FIG. 10 is a graph 1000 depicting the dependencies of the ratio 1020 of the photodiode currents as a function of detuning of the interferometer phase 1010 from the optimum tuning (Ipdc/Ipdd 1030, Ipdc 1034 and Ipdd 1032 versus the phase offset of the interferometer). In FIG. 10, Ipdc and Ipdd are normalized on the sum Ipdc+Ipdd.

Note that, in FIG. 10, the optimum tuning corresponds to $0 \pm 2\pi^{*}k$, or to $\pi^{*}(2k+1)$, where $k=0, \pm 1 \ldots$. For the case of $\pi^{*}(2k+1)$ the data are inverted so that the constructive port of the DLI becomes destructive, and vice versa.

FIG. 10 indicates that any of the illustrated parameters (Ipdc/Ipdd, Ipdc or Ipdd) can be used as a feedback signal to control and set the DLI tuning to the optimum value. The DLI may be tuned to a position for which these parameters (or one of them) is at a maximum or minimum. For example, in order to tune the DLI phase bias to 0, the ratio may be minimized. To tune the DLI phase bias to $\pi$, the ratio may be maximized. To tune the DLI phase bias to any other value, a lookup table may be employed that matches the requested bias value to a predetermined ratio. The values in the lookup table may be established during calibration of the receiver.

In summary, it has been shown that when applying the concepts set forth herein of self-adaptive receivers not reliant upon FEC, one can significantly improve the performance of DPSK receivers (both partial-DPSK and others) over a wide range of optical filtering. The same concept is applicable to mPSK and mQAM receivers with both direct detection and coherent detection schemes, and for NRZ and RZ cases. The same concept is also applicable to optical duo-binary format ODB (also known as phase-shaped binary transmission PSBT) and other direct-detection formats (on-off-keying, both RZ and NRZ).

Although FEC is not necessary to configure the receiver using the techniques described herein, FEC may be utilized, if available, in conjunction with the estimation of the amount of optical filtering. For example, a hybrid approach may be employed wherein an estimation of the amount of optical filtering in the network is utilized to generate an initial estimate of the receiver settings, and then FEC may be used to fine-tune the results. Such a technique allows the receiver settings to be rapidly converged so that the receiver performs acceptably, and then fine-tuned to allow the receiver to further improve its performance. In another example, the FEC may be used when the BER is at a relatively high value, and when the BER begins to approach zero, estimation of the amount of optical filtering may be used to fine-tune the device settings.

Furthermore, although the present application has been described in terms of a modulation format which depends on the number of available phase shifts, another way to increase the number of constellations is to employ polarization. Polarization refers to the orientation of the oscillation of a wave. By modifying the polarization, either by itself or in conjunction with employing other modulation formats such as DQPSK, more data can be encoded into a symbol. For example, a shift in phase may be used to encode two bits while a shift in polarization may be used to encode two additional bits. The combination of the phase shift and the polarization shift may therefore encode four bits of data. The present invention is equally applicable where the number of constellations are determined by the modulation format, the polarization of the light, or both.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel. Moreover, although implementations have been described with particular emphasis on P-DQPSK, other modulation formats may also be employed.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, a computing device (e.g., a workstation) or a user of a computing device, unless otherwise stated.

The scope of the invention is defined by the claims and their equivalents.

The invention claimed is:

1. A method for configuring a component of an optical receiver by adjusting a characteristic of the optical receiver, the method comprising:
   determining an amount of optical filtering applied to an optical signal received at the receiver, the amount of optical filtering representing a change of an optical bandwidth during a transmission of the optical signal;
   determining a value for the characteristic of the receiver based on the determined amount of optical filtering, determining the value comprising:
      observing a characteristic of a detector associated with the receiver, the characteristic of the detector representing at least one of an average photocurrent of a constructive port of the detector; an average photocurrent of a destructive port of the detector; a sum of the average photocurrents of the constructive and destructive ports of the detector; and a ratio of the average photocurrents of the constructive and destructive ports of the detector; and
      maximizing or minimizing the observed characteristic of the detector; and
   adjusting, by a controller connected to the receiver, the characteristic of the receiver based on the determined value for the characteristic of the receiver.

2. The method of claim 1, wherein the characteristic of the receiver is one or a combination of a decision threshold (DT) of a clock and data recovery (CDR) module associated with the receiver, a decision phase of the CDR, an electrical bandwidth of the receiver, and a free spectral range (FSR) of the optical interferometer.

3. The method of claim 1, wherein the optical signal is received from an optical link, and the optical filtering is applied by one or more optical filters or multiplexers present on the link.

4. The method of claim 1, wherein the optical signal is a modulated optical signal and is modulated according to one of the following formats: m-ary phase shift keying (mPSK), differential phase shift keying (DPSK), differential m-ary phase shift keying (DmPSK), partial differential phase shift keying (PDPSK), partial differential m-ary phase shift keying (PDmPSK), m-ary quadrature amplitude modulation (mQAM), optical dual binary (ODB), return-to-zero on-off-keying (RZ OOK), and non-return-to-zero onoff-keying (NRZ OOK).

5. The method of claim 1, wherein determining the amount of optical filtering comprises consulting a lookup table relating the amount of optical filtering to the value.

6. The method of claim 1, wherein the component is an interferometer.

7. The method of claim 1, wherein the component is a CDR.

8. An optical filtering estimation apparatus for estimating the amount of optical filtering present in an optical link, the apparatus comprising:
   an optical interferometer coupled to receive a DPSK optical signal and interfere the DPSK optical signal with itself, the optical interferometer comprising:
      a constructive output port for outputting a first signal, and
      a destructive output port for outputting a second signal;
   a differential detector coupled to the optical interferometer, the differential detector comprising:
      a first photodetector coupled to the constructive port of the interferometer to receive the first signal and generate a first photocurrent, and
      a second photodetector coupled to the destructive port of the interferometer to receive the second signal and generate a second photocurrent;
   a receiver optical power determination module for determining a receiver optical power value based on at least one characteristic of the differential detector; and
   an optical filtering estimation module for estimating an amount of optical filtering in the optical link based on the determined receiver optical power value.

9. The apparatus of claim 8, wherein the characteristic of the differential detector is: an average photocurrent of the constructive port of the detector; an average photocurrent of the destructive port of the detector; a sum of the average photocurrents of the constructive and destructive ports of the detector; or a ratio of the average photocurrents of the constructive and destructive ports of the detector.

10. The apparatus of claim 8, wherein the optical interferometer is a Delay Line Interferometer (DLI) or a Mach-Zehnder Interferometer (MZI).

11. The apparatus of claim 8, further comprising a clock and data recovery (CDR) module for converting an analog electrical signal generated by the differential detector into a digital electrical output signal.

12. The apparatus of claim 11, further comprising a non-transitory electronic device readable storage medium storing a lookup table, the lookup table storing data that relates a ratio of the first signal to the second signal to a predetermined value for the characteristic of the apparatus.

13. The apparatus of claim 12, further comprising a receiver characteristic adjustment module for adjusting a characteristic of the apparatus based on the predetermined value stored in the lookup table.

14. The apparatus of claim 13, wherein the characteristic is one of a decision threshold (DT) of a clock and data recovery (CDR) module associated with the receiver, a decision phase of the CDR, an electrical bandwidth of the receiver, and free spectral range (FSR) of the optical interferometer.

15. A method for estimating an amount of optical filtering present in an optical link, the method comprising:
   outputting, from an optical interferometer, a first signal from a constructive output port and a second signal from a destructive output port;
   receiving, at a first detector coupled to the constructive output port, the first signal and generating a first response;
   receiving, at a second detector coupled to the destructive output port, the second signal and generating a second response;

determining a ratio relating the first response to the second response;

estimating an amount of optical filtering in the optical link based on the determined ratio.

16. A method of determining a value of a characteristic of an optical receiver based on an amount of optical bandwidth of a transmission medium during a transmission of an optical signal, the method comprising:

determining an amount of optical filtering applied to the optical signal received at the receiver, the amount of optical filtering representing a change in the optical bandwidth during the transmission of the optical signal;

determining a value of the characteristic of the receiver based on the measured amount of optical filtering, determining the value comprising:

observing a characteristic of a detector associated with the receiver, the characteristic of the detector representing at least one of an average photocurrent of the constructive port of the detector; an average photocurrent of the destructive port of the detector; a sum of the average photocurrents of the constructive and destructive ports of the detector; and a ratio of the average photocurrents of the constructive and destructive ports of the detector; and maximizing or minimizing the observed characteristic of the detector; and storing the determined value of the characteristic of the receiver in a non-transitory electronic device readable medium associated with the receiver.

17. The method of claim 16, wherein determining the value further comprises minimizing a bit error rate (BER) associated with the optical signal.

18. The method of claim 16, wherein the characteristic of the receiver is one of a decision threshold (DT) of a clock and data recovery (CDR) module associated with the receiver, a decision phase of the CDR, an electrical bandwidth of the receiver, and free spectral range (FSR) of the optical interferometer.

19. The method of claim 16, wherein the optical signal is received form an optical link, and the optical filtering is applied by one or more optical filters or multiplexers present on the link.

20. The method of claim 16, wherein the optical signal is a modulated optical signal and is modulated according to one of the following formats: mPSK, DPSK, DmPSK, PDPSK, PDmPSK, mQAM, ODB, RZ OOK, and NRZ OOK.

21. A method of tuning a demodulator in an optical receiver to a phase bias of zero, the method comprising:

outputting, from the demodulator, a first signal from a constructive output port and a second signal from a destructive output port;

receiving, at a first detector coupled to the constructive output port, the first signal and generating a first response; receiving, at a second detector coupled to the destructive output port, the second signal and generating a second response;

determining a ratio relating the first response to the second response;

tuning a configuration of the demodulator based on the ratio so that the phase bias of the demodulator approaches zero, the tuning comprising changing one or more settings of the demodulator so that the ratio approaches a minimum value.

22. The method of claim 21, wherein the demodulator is an interferometer.

23. A method of tuning a demodulator in an optical receiver to a phase bias of $\pi$, the method comprising:

outputting, from the demodulator, a first signal from a constructive output port and a second signal from a destructive output port;

receiving, at a first detector coupled to the constructive output port, the first signal and generating a first response; receiving, at a second detector coupled to the destructive output port, the second signal and generating a second response;

determining a ratio relating the first response to the second response;

tuning a configuration of the demodulator based on the ratio so that the phase bias of the demodulator approaches $\pi$, the tuning comprising changing one or more settings of the demodulator so that the ratio approaches a maximum value.

24. The method of claim 23, wherein the demodulator is an interferometer.

* * * * *